F. R. & C. R. COLVIN.
TIRE PROTECTOR.
APPLICATION FILED APR. 27, 1909.
939,474.
Patented Nov. 9, 1909.
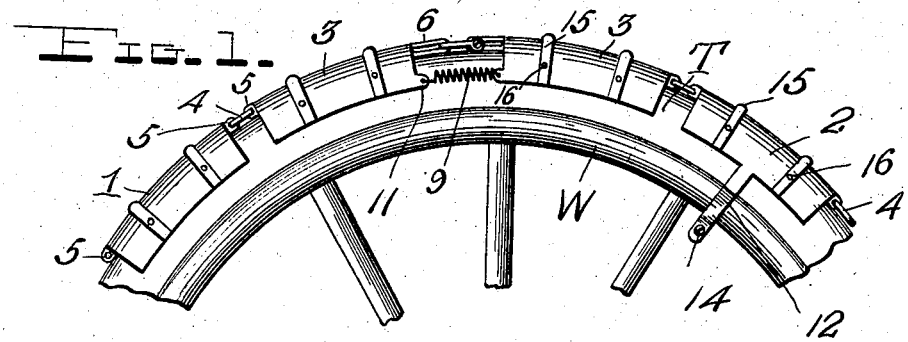
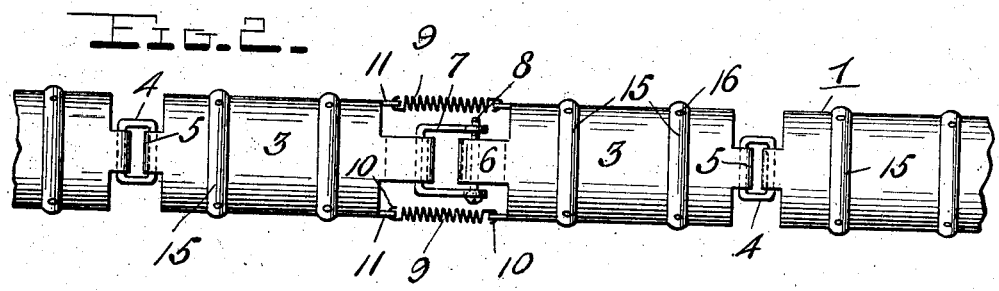
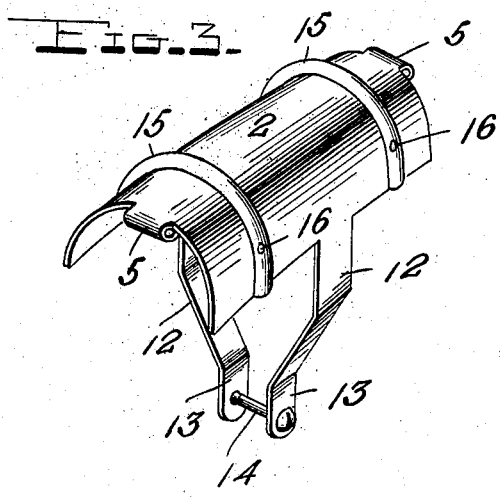
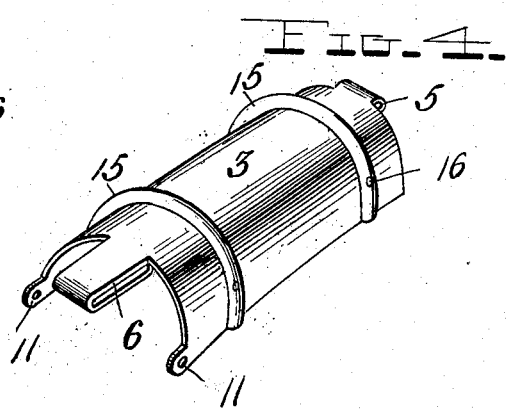

UNITED STATES PATENT OFFICE.

FRED R. COLVIN AND COLLINS R. COLVIN, OF LANSING, MICHIGAN.

TIRE-PROTECTOR.

939,474.

Specification of Letters Patent.   Patented Nov. 9, 1909.

Application filed April 27, 1909.   Serial No. 492,516.

*To all whom it may concern:*

Be it known that we, FRED R. COLVIN and COLLINS R. COLVIN, citizens of the United States, residing at Lansing, in the county of Ingham and State of Michigan, have invented certain new and useful Improvements in Tire-Protectors, of which the following is a specification, reference being had to the accompanying drawings.

This invention relates to improvements in tire protectors.

One object of the invention is to provide a simple and practical device of this character which may be readily applied to and removed from a pneumatic tire and which will adapt itself to the tire.

Another object of the invention is to provide a device of this character which will not only guard or protect the tire against puncture but also serve is an anti-skidding and anti-slipping device.

With the above and other objects in view, the invention consists of the novel features of construction and the combination and arrangement of parts hereinafter fully described and claimed, and illustrated in the accompanying drawings, in which—

Figure 1 is a detail view of a portion of a wheel showing the application of the invention thereto; Fig. 2 is a plan view of a portion of the tire protector or guard; Fig. 3 is a perspective view of one of the intermediate plates or members of the protector; and Fig. 4 is a similar view of one of the end plates or members.

In the drawings W denotes a portion of a wheel and T a pneumatic tire thereon.

The improved protector or guard for the tire is composed of a plurality of members 1, 2, 3 which are similar in form and shaped to fit the tread portion of the tire. These members are preferably in the form of metal plates bent transversely into U-form and also curved longitudinally to a slight extent and they may be of any desired length according to the size of the tire to which the protector is to be applied. Said members are loosely connected by rectangular links 4 arranged between adjacent members and engaged with eyes 5 formed integral with the end portions of said members, as clearly shown in Figs. 1 and 2 of the drawings. It will be noted that the members or plates 1 and the links 4 form a chain-like body which extends entirely around the tire and has its ends yieldingly connected, as presently explained.

The members 3 are arranged at the ends of the protector and are similar in all respects to the members 1 with the exception that their outer ends are formed with elongated eyes or loops 6 instead of the eyes 5. Said elongated eyes 6 are loosely and detachably united by a link composed of a U-shaped member 7 and a transverse screw, bolt or the like 8. The cross portion of the U-shaped member 7 extends through the eye 6 on one of the members 3 while the screw 8 extends through the eye 6 on the other member 3 and has its threaded end screwed into a threaded opening in one arm of the member 7, as shown more clearly in Fig. 2 of the drawings. This connection between the members 3 permits them to move toward and from each other in the expansion and contraction of the tire T and for the purpose of maintaining the protector in stretched position and taking up all slack, the two members 3 are further united by coil springs 9. The springs 9 are provided on opposite sides of the tire and have hook-shaped ends 10 to engage apertured ears 11 formed on the outer corners of the members 3, as clearly shown in Figs. 1, 2 and 4 of the drawings.

Each of the members 2 has formed upon the central portion of its side edges inwardly extending arms 12 to straddle the rim of the wheel W and have inwardly bent apertured ends 13 united by a transverse bolt or similar fastening 14, as shown more clearly in Fig. 3. The members 2 may be arranged at intervals around the protector, and in practice six of them are preferably used on the protector for an automobile wheel, but it will be understood that the arms 12 may, if desired, be provided upon all of the members of which the protector is composed.

If desired, the several members of the protector may be provided with transverse ribs 15 which will prevent the wheel from slipping or spinning in mud or on slippery streets and which will also tend to prevent skidding. Said ribs 15 are preferably but not necessarily made separate and secured by rivets or other fastenings 16.

From the foregoing it will be seen that the invention provides an exceedingly simple and practical device of this character which may be readily applied to a pneumatic tire and which will adapt itself to the tire when it is inflated and also as it expands and contracts. The simple construction of the device permits it to be produced at a comparatively small cost and renders it strong and durable. In applying the protector to the tire, it is placed in position when the tire is deflated so that when the tire is inflated, the protector will be stretched sufficiently to cause it to bind the tire and to prevent it from slipping around on the same, such slipping movement, however, being more effectively prevented by the arms 12 and their fastenings 14, as will be readily understood. The elastic connection between the ends of the protector is especially important in that it permits the latter to adapt itself to the tire as it gradually becomes deflated.

While the preferred embodiment of the invention has been shown and described in detail, it will be understood that various changes in form, proportion and arrangement of parts and in the details of construction may be resorted to within the spirit and scope of the invention.

Having thus described the invention what is claimed is:

1. A tire protector comprising a flexible body composed of loosely connected semi-cylindrical plates to receive the tire, the end plates being formed at their opposing ends with extended tongues bent upon themselves to provide elongated eyes, a U-shaped connecting member having its cross portion arranged in one of said eyes and its parallel arms apertured, a removable fastening passed through the other eye and the apertures in the arms of said U-shaped member, and coil springs uniting the opposing ends of the end plates and arranged at the opposite sides of said end plates.

2. The herein described tire protector comprising a flexible body to extend around the tread of a tire and composed of semi-cylindrical longitudinally curved plates, each of the latter having at the central portions of its ends integral tongues bent to form eyes, rectangular links arranged in the opposing eyes of adjacent plates to flexibly connect the same, the end plates having the tongues at their opposing ends made of greater length to provide elongated eyes, said opposing ends of the end plates being formed at their corners with apertured ears, a U-shaped bolt removably arranged in the elongated eyes of said end plates, a pair of coil springs engaged with the apertured ears on said end plates, inwardly extending arms formed integral with the side edges of certain of said plates, the inner portions of said arms being disposed in spaced parallel relation and apertured, and clamping bolts arranged in the spaced apertured ends of said arms.

In testimony whereof we hereunto affix our signatures in the presence of two witnesses.

FRED R. COLVIN.
COLLINS R. COLVIN.

Witnesses:
  EMIL R. ARNDT,
  CHRIS A. PROST